(12) United States Patent
Van Buer et al.

(10) Patent No.: US 7,233,861 B2
(45) Date of Patent: Jun. 19, 2007

(54) PREDICTION OF VEHICLE OPERATOR DESTINATIONS

(75) Inventors: Darrel J. Van Buer, Los Angeles, CA (US); Richard A. Johnson, Rochester Hills, MI (US); Son K. Dao, Northridge, CA (US); Andrea Marie Simon, Walled Lake, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/730,642

(22) Filed: Dec. 8, 2003

(65) Prior Publication Data

US 2005/0125148 A1 Jun. 9, 2005

(51) Int. Cl.
*G01C 21/34* (2006.01)

(52) U.S. Cl. .............. 701/209; 701/213; 340/995.19; 340/994

(58) Field of Classification Search ............ 701/23–27, 701/200–202, 207–210, 213–216; 340/992, 340/994, 996, 9, 995.19, 995.22, 995.1; 455/414.2, 436; 342/357.1, 357; 707/6; *G01C 21/34; G06F 165/00*
See application file for complete search history.

(56) References Cited

U.S. PATENT DOCUMENTS

| | | | | |
|---|---|---|---|---|
| 4,359,733 A | * | 11/1982 | O'Neill ..................... | 342/36 |
| 4,361,202 A | * | 11/1982 | Minovitch .................. | 180/168 |
| 5,022,497 A | * | 6/1991 | Thanagavelu ............... | 187/382 |
| 5,024,295 A | * | 6/1991 | Thangavelu ................ | 187/382 |
| 5,204,817 A | * | 4/1993 | Yoshida ..................... | 701/209 |
| 5,331,561 A | * | 7/1994 | Barrett et al. ............. | 701/205 |
| 5,354,957 A | * | 10/1994 | Robertson ................. | 187/247 |
| 5,508,930 A | * | 4/1996 | Smith, Jr. .................. | 701/201 |
| 5,767,461 A | * | 6/1998 | Nakagawa et al. ......... | 187/382 |
| 5,948,040 A | * | 9/1999 | DeLorme et al. .......... | 701/201 |
| 6,067,501 A | * | 5/2000 | Vieweg ..................... | 701/209 |
| 6,145,631 A | * | 11/2000 | Hikita et al. ............... | 187/383 |
| 6,169,515 B1 | * | 1/2001 | Mannings et al. ....... | 342/357.1 |
| 6,233,517 B1 | * | 5/2001 | Froeberg ................... | 701/117 |
| 6,237,721 B1 | * | 5/2001 | Siikonen ................... | 187/382 |
| 6,327,522 B1 | * | 12/2001 | Kojima et al. ................ | 701/1 |
| 6,345,697 B1 | * | 2/2002 | Siikonen ................... | 187/382 |
| 6,351,708 B1 | | 2/2002 | Takagi et al. .............. | 701/209 |
| 6,356,838 B1 | * | 3/2002 | Paul .......................... | 701/209 |

(Continued)

FOREIGN PATENT DOCUMENTS

EP 110171 A * 6/1984

(Continued)

OTHER PUBLICATIONS

"Vehicle Navigation & information systems conference procedings" (P-253), Society of Automotive Engineers, Inc., Oct. 1991, pp. 789-796.*

(Continued)

*Primary Examiner*—Cuong Nguyen
(74) *Attorney, Agent, or Firm*—Kathryn A. Marra (57) ABSTRACT

A method for predicting vehicle operator destinations including receiving vehicle position data for a vehicle. The vehicle position data for a current trip is compared to vehicle position data for a previous trip to predict a destination for the vehicle. A path to the destination is suggested.

22 Claims, 4 Drawing Sheets

U.S. PATENT DOCUMENTS

| | | | |
|---|---|---|---|
| 6,370,126 B1* | 4/2002 | De Baere et al. | 370/316 |
| 6,385,535 B2 | 5/2002 | Ohishi et al. | 701/209 |
| 6,505,118 B2 | 1/2003 | Chowanic et al. | 701/209 |
| 6,526,349 B2* | 2/2003 | Bullock et al. | 701/209 |
| 6,526,352 B1* | 2/2003 | Breed et al. | 701/213 |
| 6,553,269 B1* | 4/2003 | Hikita | 700/48 |
| 6,553,308 B1* | 4/2003 | Uhlmann et al. | 701/208 |
| 6,567,745 B2* | 5/2003 | Fuchs et al. | 701/209 |
| 6,577,249 B1* | 6/2003 | Akatsuka et al. | 340/988 |
| 6,594,564 B1* | 7/2003 | Vahle et al. | 701/35 |
| 6,597,906 B1* | 7/2003 | Van Leeuwen et al. | 455/436 |
| 6,629,034 B1* | 9/2003 | Kozak et al. | 701/200 |
| 6,650,284 B1* | 11/2003 | Mannings et al. | 342/357.09 |
| 6,745,123 B1* | 6/2004 | Petzold et al. | 701/209 |
| 6,748,318 B1* | 6/2004 | Jones | 701/201 |
| 6,801,850 B1* | 10/2004 | Wolfson | 701/209 |
| 6,807,483 B1* | 10/2004 | Chao et al. | 701/210 |
| 6,862,524 B1* | 3/2005 | Nagda et al. | 701/209 |
| 6,895,329 B1* | 5/2005 | Wolfson | 701/209 |
| 6,895,929 B2* | 5/2005 | Grossmann et al. | 123/399 |
| 6,907,336 B2* | 6/2005 | Gray et al. | 701/50 |
| 6,944,533 B2* | 9/2005 | Kozak et al. | 701/200 |
| 6,965,827 B1* | 11/2005 | Wolfson | 701/207 |
| 7,130,743 B2* | 10/2006 | Kudo et al. | 701/209 |
| 2002/0156572 A1* | 10/2002 | Bullock et al. | 701/209 |
| 2002/0161517 A1* | 10/2002 | Yano et al. | 701/209 |
| 2003/0191563 A1* | 10/2003 | Eagleton et al. | 701/29 |
| 2003/0191585 A1* | 10/2003 | Sakamoto et al. | 701/211 |
| 2004/0073361 A1* | 4/2004 | Tzamaloukas et al. | 701/210 |
| 2005/0027447 A1* | 2/2005 | Hirose et al. | 701/210 |
| 2005/0027448 A1* | 2/2005 | Takenaga et al. | 701/211 |
| 2005/0071081 A1* | 3/2005 | Hirose et al. | 701/210 |
| 2005/0075784 A1* | 4/2005 | Gray et al. | 701/201 |
| 2005/0090974 A1* | 4/2005 | Hirose | 701/208 |
| 2005/0125148 A1* | 6/2005 | Van Buer et al. | 701/209 |
| 2005/0137786 A1* | 6/2005 | Breed et al. | 701/200 |

FOREIGN PATENT DOCUMENTS

| | | | |
|---|---|---|---|
| JP | 09115098 A | * | 5/1997 |
| JP | 11135405 A | * | 5/1999 |
| JP | 3064997 B2 | * | 7/2000 |
| WO | WO 94/24582 | | 10/1994 |

OTHER PUBLICATIONS

Helleker, Real-time traveller information in everyone's pocketl, IEEE Vehicle Navigation & Information Systems Conferen ce, Ottawa, VNIS 1993, pp. 49-52.*

PROMIS—Personal Mobile Traveller and Traffic Information Service—Generic Promise System Architecture, ver. 2, Telematic Application Programmer A2, Transport, Feb. 12, 1999.*

Yta Shimamura et al., Combined position detection system for pedestrian/train mode, 1994 Vehicle Navigation & Information Systems Conference Proceedings, Yokohama, Japan, Aug. 31, 1994, pp. 603-606.*

\* cited by examiner

PREDICTION OF VEHICLE OPERATOR DESTINATIONS

BACKGROUND OF THE INVENTION

The present disclosure relates generally to the prediction of vehicle operator destinations and in particular, to a method of suggesting the likely path of a vehicle based on previous paths taken by the vehicle operator.

In recent years, navigation systems mounted in vehicles for displaying a map to vehicle operators have become more common. Most navigation systems include a device, such as a global positioning system (GPS) receiver, for determining the exact location of a vehicle. GPS refers to a collection of satellites owned by the United States Government that provide highly accurate, worldwide positioning and navigation information twenty-four hours per day. An increasing number of affordable GPS receivers are being manufactured for consumer as well as non-consumer use. GPS receivers are continuing to become less expensive, smaller in size and able to support more features. Many of the vehicle navigation systems that are currently being manufactured include GPS receivers.

A destination point for a vehicle is typically set in a navigation system by a vehicle operator or by a passenger using a remote control device or the like. The setting of the destination point can be based on items such as: the name of a town or region; a telephone number; or a pre-selected geographical point from a list of pre-registered geographical points. Current navigation systems require the use of a map to determine routes and to perform navigation functions. A typical navigation system includes a database or access to a database that contains streets and other geographical landmarks. These streets and other geographical landmarks are correlated to GPS coordinates received via a GPS receiver in order to determine the physical location of a vehicle in terms of map locations.

The ability to know that a vehicle operator will be taking a particular route, coupled with vehicle status information and environment data (e.g., traffic, weather) can be utilized to direct the vehicle operator to particular locations (e.g., next gas station) and/or to avoid particular locations (e.g., heavy traffic, bad weather). A disadvantage of using geographical landmarks and mapping software is that the database holding the maps can require a significant amount of storage space and the map becomes out of date as roads and landmarks change. Alternatively, a vehicle operator may subscribe to a central map database instead of having the map database located within the vehicle. This approach, of subscribing to a map database, can become costly due to wireless access fees and database fees.

BRIEF DESCRIPTION OF THE INVENTION

An exemplary embodiment of the present invention includes a method for predicting vehicle operator destinations. Vehicle position data for a vehicle is received. The vehicle position data for a current trip is compared to vehicle position data for a previous trip to predict a destination for the vehicle. A path to the destination is suggested.

In a further aspect, a system for predicting vehicle operator destinations includes a navigation device, a storage device, and a microprocessor in communication with the navigation device and the storage device. The microprocessor includes instructions to implement a method including receiving vehicle position data for a vehicle via said navigation device. The vehicle position data for a current trip is compared to vehicle position data for a previous trip to predict a destination for the vehicle. The vehicle position data for a previous trip is stored in the database. A path to the destination is suggested.

In still another aspect, a computer program product for predicting vehicle operator destinations includes a storage medium readable by a processing circuit and storing instructions for execution by the processing circuit for performing a method. The method includes receiving vehicle position data for a vehicle. The vehicle position data for a current trip is compared to vehicle position data for a previous trip to predict a destination for the vehicle. A path to the destination is suggested.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

An exemplary embodiment of the present invention is a knowledge-based software system that converts raw vehicle operator contextual information (e.g., GPS data) to knowledge (e.g., rules and facts) about a vehicle operator's driving behavior. Learning techniques are utilized to predict the vehicle operator's route and destination in real-time based on continuous GPS feeds and knowledge of the vehicle operator's previous behavior while driving. In addition, an exemplary embodiment of the present invention may be utilized to automatically generate a vehicle operator's driving behavior profile that can be used by telematics services (e.g., navigation, travel, car maintenance).

The developed knowledge-based software system consists of a set of operations including fuzzy or approximate tests of time of day, day of week, positions and paths made up of a series of positions. The approximations in the tests manage the variability in actual and apparent vehicle operator behavior caused by limitations on the precision and repeatability of the position reporting device and variations in the vehicle operator, traffic and parking from day to day. The rules or decision procedures control the segmentation of travel into individual trips (e.g., based on an extended layover at a position), compiling sets of similar trips into idioms used by a vehicle operator, making and revising predictions of likely vehicle operator behavior by matching these idioms with the trip in process, and combining these predictions with information from external sources. The external sources may include vehicle telematics (e.g., need for fuel or service), contact and appointment data from electronic organizers, traffic information services, and service directories.

In an exemplary embodiment of the present invention, vehicle operators' driving behavior profiles are created automatically based solely on the navigation data, without utilizing any map or geo-coding databases/services to convert position data into street addresses. This is performed by utilizing position reporting systems (e.g., GPS) that provide accuracy and repeatability more granular than the typical spacing between streets. One advantage this approach offers is that it does not require a local road database. A local road database typically requires a large amount of storage space, becomes less accurate over the service life of a vehicle as roads change and often omits private roads. Another advantage to this approach is that it does not require continuous access to a database service. This may result in a significant cost savings in terms of wireless access fees and database access fees.

Figure 1:
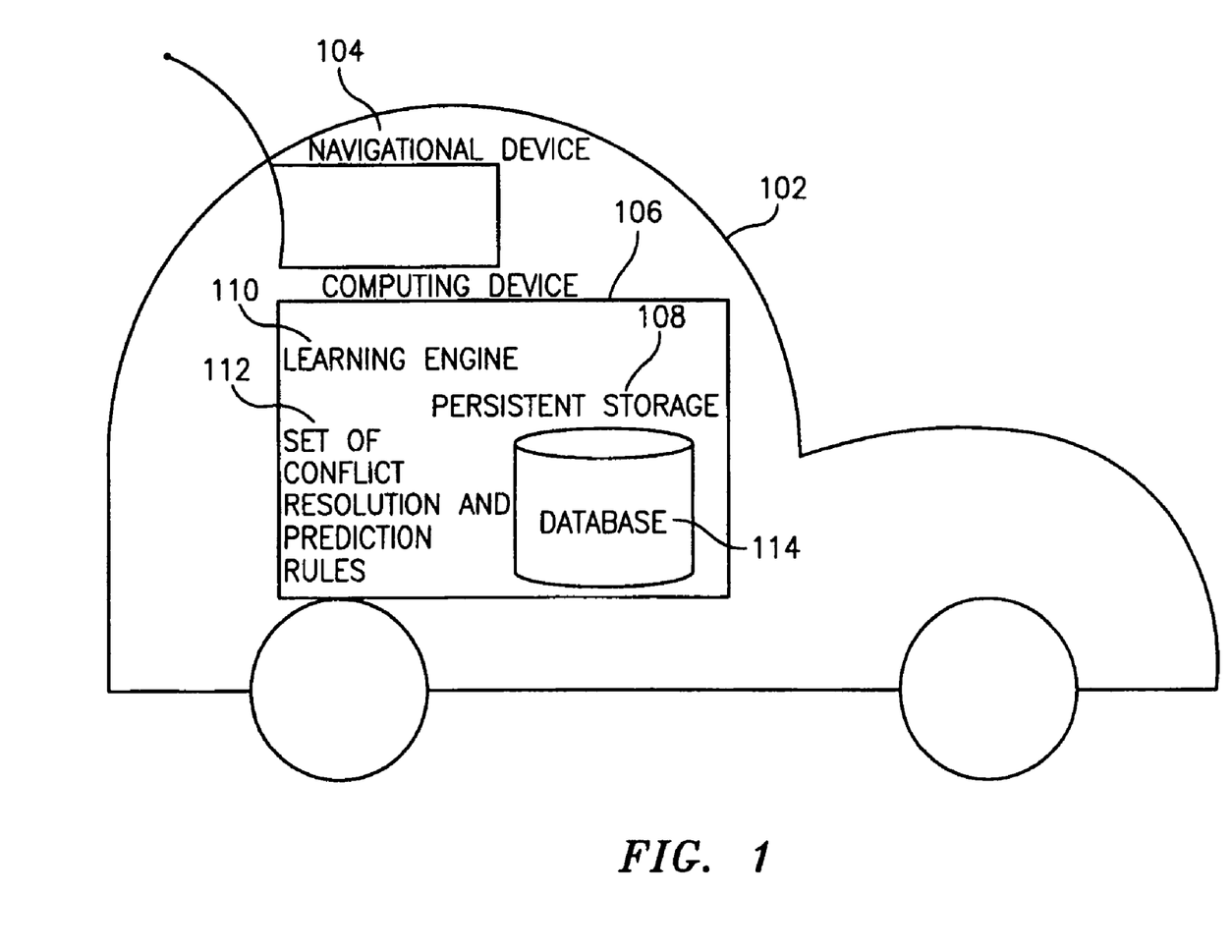
FIG. 1 is a block diagram of an exemplary system for predicting vehicle operator driving patterns.

FIG. 1 is a block diagram of an exemplary system for predicting vehicle operator driving patterns that includes both hardware and software components contained within a vehicle 102. One hardware component is a navigation device 104 (e.g., a GPS receiver) for continuously determining position, heading and speed of the vehicle 102. Another hardware component is a computing device 106 (e.g., a microprocessor) to perform learning and reasoning. The computing device 106 includes access to persistent storage 108. The persistent storage 108 may be implemented using any storage device known in art such as non-volatile memory in the computing device 106 or a small disk drive accessible by the computing device 106.

The software components shown in FIG. 1 include a learning engine 110, a set of conflict resolution and prediction rules 112 and a database 114. The system collects data from a GPS navigation device 104 while the vehicle is being driven and matches the data with previously collected data to make a prediction of the operator's future destinations in real-time using the conflict resolution and prediction rules 112. Consequently, with the ability to anticipate the operator's next move, the system provides information that may align with the vehicle operator's needs (e.g., gasoline, hotels) and may coordinate with providers of external conditions to help the operator improve the driving condition (e.g., avoid traffic congestion, avoid inclement weather). Gradually, a database 114 that describes vehicle operator behaviors and preferences is incrementally derived from the learning engine 110.

The navigation device 104 may include any device known in the art for providing position data such as a GPS device or an inertial navigation device. Currently, a GPS device may provide the most cost-effective source of adequate position information, but rapid progress in micro electro mechanical systems (MEMS) technology may lead to a low cost inertial navigational alternative in the near future. Both approaches have their advantages and disadvantages. For example: GPS may lose reception of satellites blocked by terrain, buildings and weather; and MEMS may experience drift from an accumulation of measurement errors.

The navigation device 104 may either present reports automatically based on time and/or movement or by being polled regularly. The frequency of reporting has to be high enough to recognize vehicle stops and turns. In an exemplary embodiment of the present invention being utilized for a typical automobile application using GPS as the navigation device 104, position reports in the range of five to one hundred meters of change in position and in the range of one second for a moving vehicle are utilized. Smaller changes in position are both beyond the limitations of GPS and may be finer than required for general planning and navigation. One second at normal driving speed is not more than thirty to forty meters, and less at sharp turns when closer position reports are most useful. Accuracy and repeatability need to be sufficient to distinguish position to the nearest roadway. Individual roads are typically from three to thirty meters wide and rarely spaced closer than thirty meters.

In an alternate exemplary embodiment of the present invention, one or more of the components depicted in FIG. 1 are physically located in a different geographic location than the vehicle 102 and/or the other components. For example, the persistent storage 108 may be located in a central location and accessed from the vehicle 102 via a wireless network connection. In another example, a portion of the persistent storage 108 is located within the vehicle 102, and another portion is located in a central location and accessed via a network.

Figure 2:
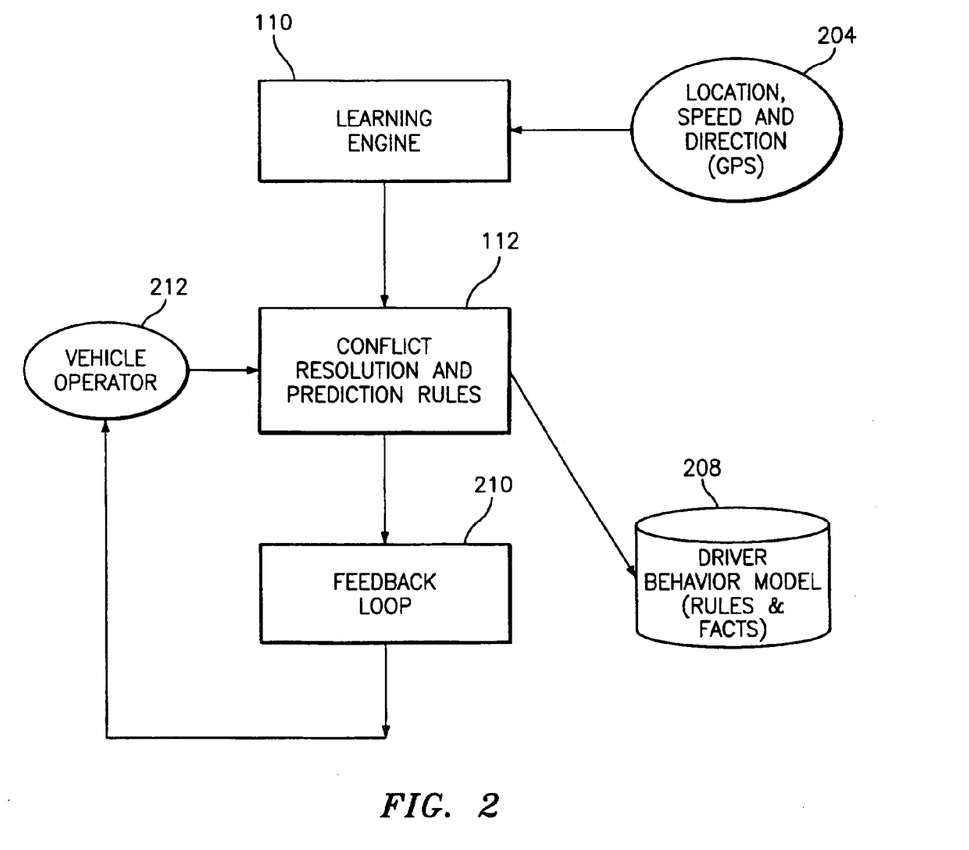
FIG. 2 is a block diagram of exemplary software components for predicting vehicle operator driving patterns.

FIG. 2 is a block diagram of exemplary software components for predicting vehicle operator driving patterns. The learning engine 106 receives (e.g., every few seconds, when the vehicle location changes) a series of reports 204 from the GPS navigation device 104. Any navigation device 104 that can provide location information may be utilized by exemplary embodiments of the present invention (e.g., GPS receiver, inertial navigation device). Each report 204 from the GPS navigation device 104 includes a position that may be expressed as latitude and longitude, and a timestamp. In addition, the report 204 may include speed and direction. While speed and direction can be estimated by comparison to the preceding position report 204, a more accurate estimate may be available from the GPS navigation device 104. The learning engine 106 collects and segments the individual positions into individual trips for discovering patterns of similar trips. The output of the learning engine 106 is a set of high-level messages such as start of trip, end of trip and reports of patterns. The learning engine may be rules-based and implemented utilizing any tool for building expert systems such as C Language Integrated Production System (CLIPS) or Java Expert Shell System (JESS).

Still referring to FIG. 2, the conflict resolution and prediction rules 112 maintain the driver behavior model database 208 including the rules and facts. The conflict resolution and prediction rules 112 may be executed in an expert system environment (e.g., CLIPS, JESS) and initiated by the learning engine 106. In an exemplary embodiment of the present invention, the driver behavior model database 208 is located in or accessed via the persistent storage 108. The conflict resolution and prediction rules 112 also provide feedback, via the feedback loop 210 to the vehicle operator 212. This feedback may be advice to the vehicle operator 212 such as how to avoid traffic to a predicted destination. Alternatively, the feedback loop 210 may seek guidance from the vehicle operator when different predictions lead to different advice. In addition, the persistent storage 108 may be utilized to store the vehicle operator's driving history, observed patterns, rules, and data downloaded from electronic organizers (e.g., appointments and contact information).

One of the conflict resolution and prediction rules 112 implemented by the learning engine 106 computes the following numeric values summarizing the differences between two paths. It may be utilized to determine if the current path is different from previous paths. Each path consists of a list of coordinates from the navigation device 104 (e.g., latitude and longitude). The driver behaviors model database 208 stores a copy of each path and statistics associated with each path (e.g., time of day, day of week). In an exemplary embodiment of the present invention, results of the comparison between two paths includes:

The distance along the beginning of one path that does not match the other path;

The distance at the end of one of the paths that does not match the other path, this may be the same path or the other path;

The distance along the first path that is considered to run roughly parallel to the other path;

The area between the two paths along this parallel distance;

The mean distance between these parallel paths, computed as the above area divided by the parallel distance; and The coordinates of the first point (if any) where the paths move substantially apart.

In an exemplary embodiment of the present invention, the above procedure may be written in Java or C to handle the many cases as the segments of the path cross or make transitions between segments. Even when two paths are generated from the record of two identical trips in the vehicle, the points recorded will vary between paths due to limitations on the precision and repeatability of the navigation device 104 and variations in speed due to the flow of traffic.

Figure 3:
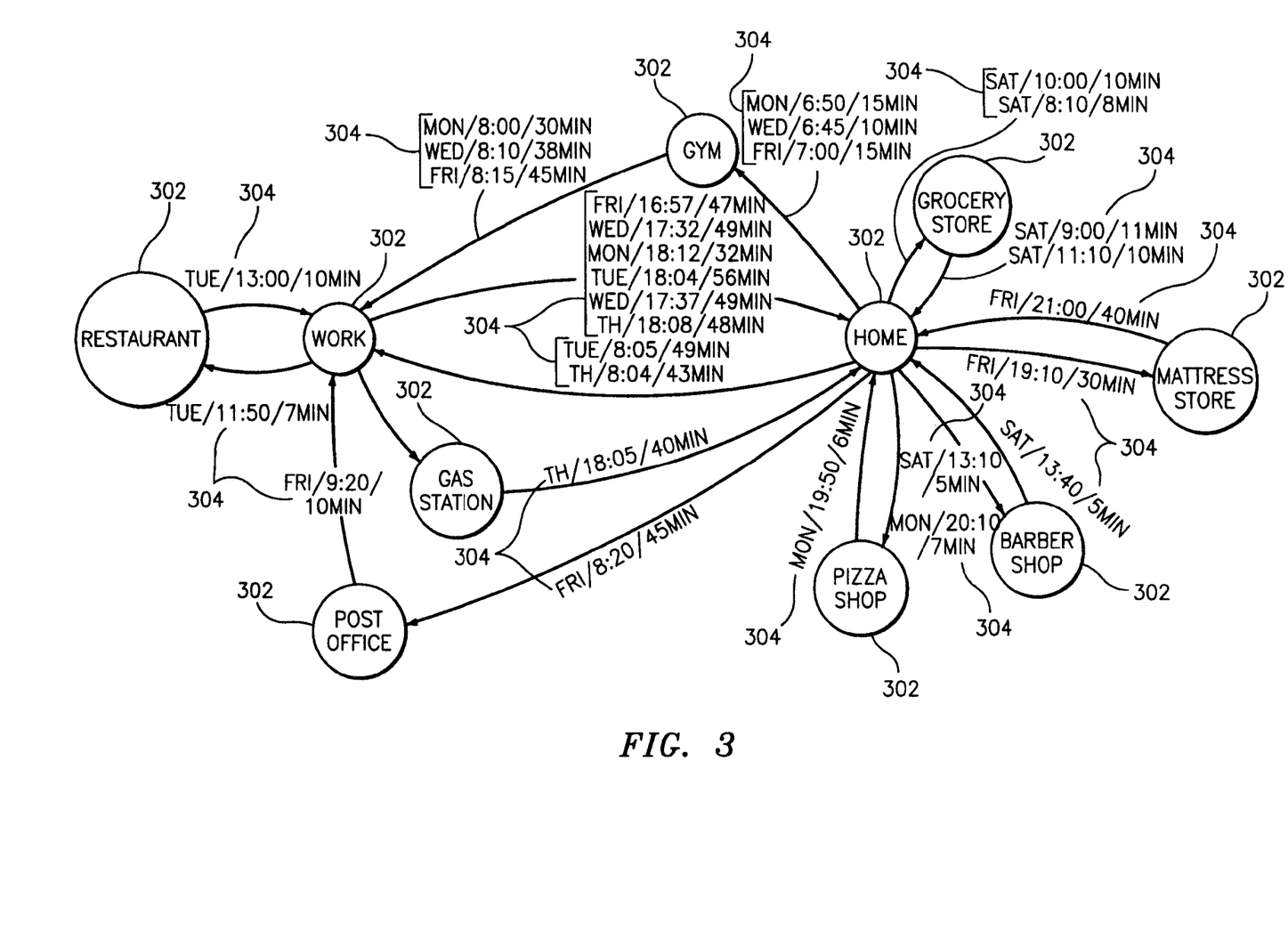
FIG. 3 is a graphical representation of an exemplary vehicle operator driving pattern.

FIG. 3 is a graphical representation of an exemplary vehicle operator driving pattern including multiple paths and corresponding statistics. It represents the type of information that can be learned by the learning engine 106 utilizing an exemplary embodiment of the present invention, and thus may be predicted. The lines represent plots of the coordinate sequence for a route, the circles are locations 302 that represent start and end points for trips. The labels 304 along the routes are the information that would be averaged to characterize a trip. For example, the top line from the starting location 302 labeled "work" to the ending location 302 labeled "home" represents a trip on six different weekday evenings, with an average departure time of 5:45 p.m. and an average duration of forty-seven minutes. The labels on the locations 302 are for convenience in discussing FIG. 3, they are not required for predicting vehicle operator driving patterns utilizing an exemplary embodiment of the present invention. In some cases, such labels may be derived automatically by consulting a geographic database or coordinating with the vehicle operator's appointment book. A few locations 302 such as home and work may be guessed based on being the start and end points for the largest number of trips. The graph depicted in FIG. 3 is meant to be a sample of a subset of the kind of data that may be collected by the learning engine 106 for a particular vehicle operator.

As described previously, the conflict resolution and prediction rules 112 control the segmentation of travel into individual trips (e.g., based on extended layover at a position), compiling sets of similar trips into idioms used by a vehicle operator, making and revising predictions of likely vehicle operator behavior by matching these idioms with the trip in progress and combing these predictions with information from external sources.

Trip segmentation rules may be simplified if information from the vehicle 102 is available indicating whether the vehicle 102 is running or not. In this case, turning on the vehicle 102 signals the start of a trip and turning it off signals the completion. When this information is not available, it may be derived from watching the reports from the navigation device 104. Whenever approximately the same location and near zero velocity is reported for more than a few minutes, it can be presumed that the vehicle 102 is between trips. Some additional processing is required to manage anomalies where the navigation device 104 cannot report position because power is removed when the vehicle 102 is off or located inside a structure that blocks GPS signals. Immediately following such conditions, there may be some additional delay while the navigation device 104 reinitializes (e.g., reacquires satellites). In this case, additional rules will be utilized to estimate corrections to the start of a new trip. The final output of these rules is a record of every trip made in the vehicle 102. For each trip, the starting and ending date, time and position are recorded, along with a record of the path followed, as depicted in the example shown in FIG. 3.

The record of a path may be either a record of every location reported, in order, from the navigation device 104, or alternatively, a condensed abstract. An effective abstract may be derived from the complete record by omitting points that can be adequately interpolated between the remaining points. The exact threshold may vary depending on the application, but it in an exemplary embodiment of the present invention it is as large as common road widths, slightly larger than navigation errors, but smaller than the distance between most parallel roads. In an exemplary embodiment of the present invention utilizing a GPS navigation device 104, the threshold is about fifty meters. Since many streets and roads contain long, straight segments, the segments between turns can be substantially compressed. This compression can result in cost savings due to using less persistent storage 108.

Creating the rules that recognize driving patterns may be performed by comparing the locations of the end points, the paths taken, the time of day, and the duration of the trip. All of these comparisons allow for some inexactness of the matches that result from the precision of the navigation device 104, moderate variation in traffic and human variation. Trips that match are collected into aggregated descriptions that represent the typical trip and some indication of the range of variation in the parameters. Additional matches can be recognized based on trips that relax some of these criteria (e.g., follow the same path in the opposite direction, or are similar in every way except the route). In an exemplary embodiment of the present invention, the description of a recurring trip may include the average endpoint location, the path, the average time of day the trip starts, the average trip time, the number of similar trips included and the days of the week observed for this trip.

The amount of variation accepted impacts whether the results include a somewhat larger or smaller collection of recognized trips. The sources of variability may include navigation errors, traffic variations, parking, and human factors. Navigation errors occur because GPS readings for the same location may vary from about ten to twenty meters. Traffic variations result from the vehicle operator 212 utilizing different lanes and different speeds. Lane choice can introduce a variation of about three to thirty meters and traffic variation in congested urban areas can result in changes in travel time of fifty percent or more from trip to trip. Because many locations have large parking lots and substantial variation in the available spaces, parking variations can result in one hundred meters or more between trips. In an exemplary embodiment of the present invention, the ends of trips are considered to be in the same location if they are less than about one hundred and eighty-six meters apart. In addition, two routes are considered the same if their average separation is less than about forty-seven meters. Also, the start time of a trip matches if it is within one hour of the other and the duration of a trip matches if it is within ten minutes (or alternatively, if the longer duration is at most fifty percent greater). In an alternate exemplary embodiment of the present invention, the matching for some trips is improved by replacing fixed thresholds by tests based on a statistical measurement of the error of a group of points.

Rule making and revising predictions of likely driver behavior by matching patterns with the trip in progress provide a way to anticipate the vehicle operator's destination and possible routes. In an exemplary embodiment of the present invention, the time and location of the current travel is compared with those previously observed. The time and position are compared as well as the day of the week. For example, if every instance of some prior collection of trips occurred only on Monday through Friday but today is Saturday, the trip would not be a candidate for predicting the destination. In the event that this is the destination, on arrival this trip would probably meet the requirements to be added to the collection and future Saturdays would match. In many cases, multiple trips will match and the frequency and day of week information may be utilized to rank the alternatives.

An additional kind of conflict resolution and prediction rule 112 uses the predicted travel path as the basis for other applications. For example, each projected route could be checked with a traffic advisory service. If some of the routes would encounter severe traffic problems, the vehicle operator could be advised to take one of the other routes. If all routes would encounter traffic, a mapping service may be consulted for new routes. In another example, if the vehicle sensors report low fuel, this fact plus a likely route may be fed to a directory service or an electronic commerce agent to find the most convenient station, the best price or a brand preferred by the vehicle operator 212.

In alternate exemplary embodiments of the present invention, applications that provide driving directions to unfamiliar destinations may utilize the driver behavior model database 208 to adjust the level of detail to the vehicle operator's familiarity with an area. For example, the driving directions could be shortened from a turn-by-turn route the whole way to directions to drive to a familiar location, as determined by the vehicle operator's driving history, and then a turn-by-turn route to the destination from the familiar location. In another alternate exemplary embodiment of the present invention, additional data from sensors on the vehicle 102 may be made available to the system. Additional data useful to the vehicle operator's planning such as those involving service and maintenance (e.g., low fuel levels, imminent breakdowns, vehicle status) may also be utilized when providing feedback to the vehicle operator 212. In addition, speed and steering data may also be utilized to provide dead-reckoning redundancy if the GPS signal is lost.

Figure 4:
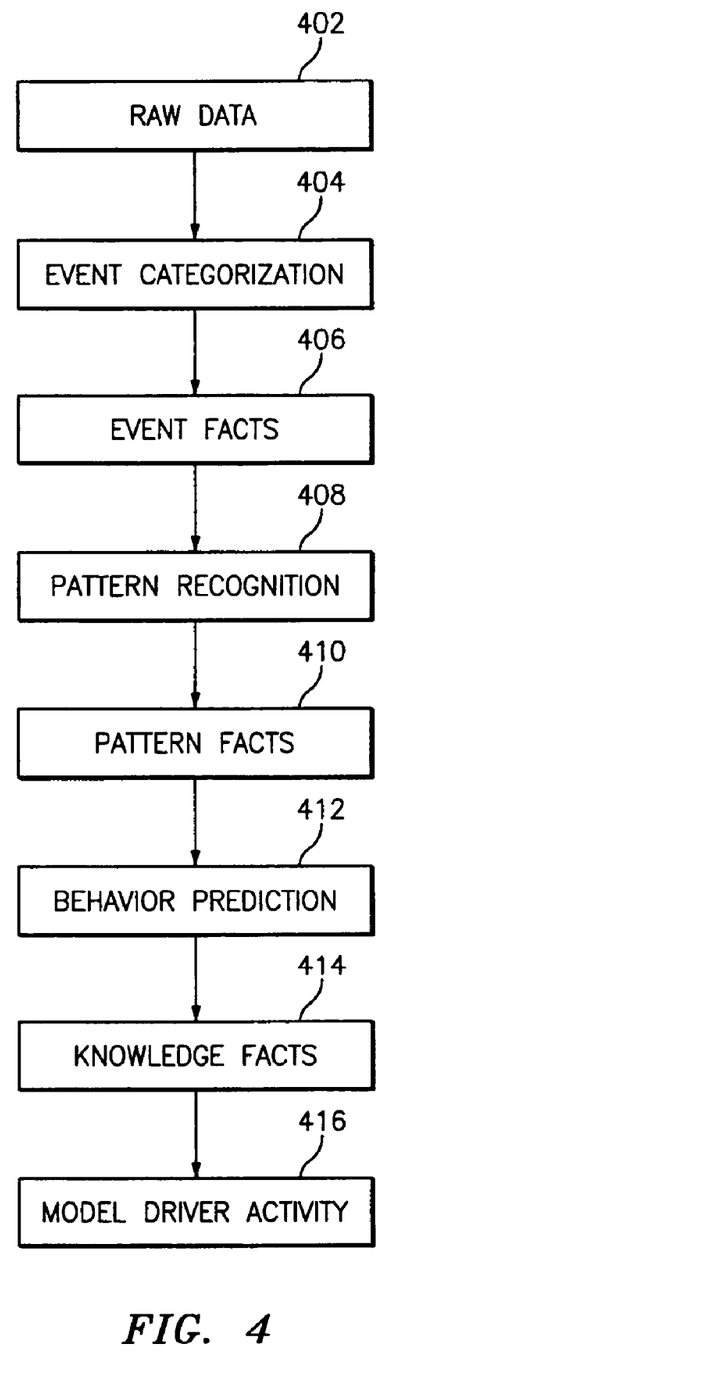
FIG. 4 is a block diagram of an exemplary process flow for predicting vehicle operator driving patterns.

FIG. 4 is a block diagram of an exemplary process flow for predicting vehicle operator driving patterns by creating a model of driver activity 416 from raw geographic position data 402. The model of vehicle operator activity 416 is created by the learning engine 106 utilizing the conflict resolution and prediction rules 112. The raw geographic position data 402 includes reports from a navigation device 104 such as a low cost GPS receiver. Each report is a record including data such as the time and date to the second, position coordinates (e.g., latitude and longitude coordinates) and optionally speed and heading. When speed and/or heading are not provided by the navigation device 104, these values may be estimated with a comparison to the time and location reported in the previous record. Whenever a vehicle with a GPS receiver is in use, a series of GPS records form the basis for learning a vehicle operator's driving history. In the discussion that follows, unless otherwise noted, time includes both time and date. In an exemplary embodiment of the present invention, the precision utilized to store position information is accurate to within a few meters (e.g., about eight significant digits) and time is kept accurate to one second over either several months or the useful life of the vehicle (e.g., seven to nine significant digits).

At step 404 in FIG. 4, event categorization is performed to compare the last few position reports to identify transitions between being parked or stopped and being underway. Output from event categorization, at step 404, includes event facts 406. This process may be supplemented with other information from the vehicle 102 such as whether the vehicle 102 is turned on or off. This recent history may be summarized in a record including the time, position, heading and speed at the previous GPS report. When the vehicle 102 has been stationary, the process also records how long the vehicle 102 has been stationary. When the vehicle 102 is moving, the process also keeps track (e.g., with an ordered list) of all the GPS coordinates en-route. There may be gaps in the reports from the GPS, most commonly because either the GPS power was off (often because the vehicle was off) or loss of a satellite signal due to terrain or buildings. The event facts are records that include: the time and location at the beginning of a trip; the time and location at the completion of a trip; and the route taken. In an exemplary embodiment of the present invention, the route is a record of the sequence of latitude and longitude reports. These outputs and the current GPS report are included in the event facts 406 which are output from the event categorization process at step 404.

An exemplary event categorization rule, used during the event categorization process at step 404, for determining if a vehicle was moving but just stopped includes:

---

IF at the last reported position, speed was nonzero
    AND GPS now reports zero speed at approximately the same location
THEN forget these old facts
    AND the last reported position is now the time and position reported
        by the GPS with zero speed
    AND increment the time spent stationary by the time between the last report and now.

---

Another exemplary event categorization rule, used during the event categorization process at step 404, includes:

---

IF the GPS reports travel at over 3 MPH, and close to the last reported position
THEN forget these old facts
    AND the last reported position is now the time, speed and position
        reported by the GPS on the heading from the last position to the
        current position
    ALSO, IF vehicle had been at the old position for 6 minutes or more
        (implies vehicle was parked), add to the database the facts
        A trip came to an end at the old position when vehicle first
            stopped
        A new trip began at the old position at the time reported by the
            GPS minus the estimated time to get from the last
            position to here

---

At step 408 in FIG. 4, pattern recognition is performed to record each trip and to compare it to the other trips that have been made. As part of pattern recognition, the learning engine 106 invokes conflict resolution and prediction rules 112. The output from step 408 includes pattern facts 410 that may be stored in the driver behavior model database 208. In the simplest case where the events describe the first or only time a trip has been made, a new pattern fact is created to record the details of the trip. This record contains the starting time and location, ending time and location and the route followed. In an exemplary embodiment of the present invention, the route information is substantially compressed by eliminating GPS positions that can be interpolated with modest error based on the remaining points. The amount of compression varies with the nature of the roads. For example, long straight roads require fewer positions than winding roads.

Patterns of trips are recognized in a number of ways, and the following list is not exhaustive of useful patterns. In an exemplary embodiment of the present invention, the approximate time of day is part of the similarity test, so an otherwise identical trip at nine a.m. and three p.m. is seen as two different trips. This is somewhat arbitrary, but may lead to fewer wrong predictions for drivers with different patterns at different times of day. For drivers who make the same trip several times a day, this approach will usually infer multiple patterns, each useful at a different time of day. In the following cases, about the same time of day means within about an hour and about the same driving time means either within about ten minutes or with a ratio between 0.667 and 1.5. The same location means within about one hundred and eighty-six meters. "Take the same route" means that the average distance between the two routes is less than about forty-seven meters. Other values for these tests are possible, but if too low, almost nothing will match and if too high different trips will be treated as matching. These values may be chosen empirically during testing to give reasonable results and may be modified based on actual data. In the case of comparisons to a known group of similar trips, these tests may be improved by basing the test on the standard deviation of the relevant values.

In an exemplary embodiment of the present invention, two trips are combined into a recognized pattern when they start and end at about the same location, both trips start at about the same time of day, both have about the same driving time and both take the same route. The pattern is recorded based on the average of the start and end locations, the average start time, the average driving time along the route of the first trip, and on the two days of the week the trips were taken (or one day if the same weekday). The record also notes when it is the average of two trips.

Additional trips will be added to a pattern if the trip matches the pattern in the same way as above. When an additional trip is added the averages, days of the week and the count are adjusted for the additional trip. Other patterns are recognized as a one-time occurrence for a return trip (i.e., start of one is the end of the other and vice versa) with similar travel time and for a trip with the same start and end but a different route. As these patterns are recognized, they are added to the pattern fact database. An exemplary conflict resolution and prediction rule 112 for pattern recognition includes:

```
/* See-first-repeat:
IF there are two trips made:
    AND both starting at about the same time of day;
    AND both take about the same time to drive;
    AND both start at about the same location and end at about the
    same location;
    AND the routes match;
THEN replace the record of the two trips with a regular-trip with
these properties:
    It starts at the average location and time of day the two trips
```

-continued

```
started; It ends at the average location the two trips ended;
It follows the route of the first trip;
The driving time is the average of the two trips;
It happens on the days of the week the trips did;
It happens twice.
```

At step 412 in FIG. 4, behavior prediction rules are executed to predict where the current trip is going and the route that will be taken. The output from executing the behavior prediction rules includes knowledge facts 414 that are input into modeling the driver activity 416. This is performed by comparing the time and location at the start of the current driving route with each of the observed and stored patterns located in the driver behavior model database 208 by looking for trips with a similar starting location. In addition, the day of the week can be used to modify the similarity test. For example, if every previous trip in one pattern was on Monday through Thursday but today is Saturday, this pattern is less likely to be the right prediction. If today is Friday, it is more likely than for Saturday, but less than on Wednesday. Several prior patterns may match the current start because of variations in the past due to factors such as traffic, road construction, carpools and doctor's appointments. The relative frequency of the various alternatives can be utilized to rank the likelihood of the lower scores when the current trip diverges from a predicted route.

When information about a driver's current plans is available from other sources, it may be possible to make additional projections or better rank the existing predictions. For example, a growing number of people use electronic organizers (e.g., the PALM PILOT) to record their appointments and contact information. With appropriate hardware (e.g. a wireless data link such as BLUE TOOTH) and software in the organizer, an exemplary embodiment of the present invention may request today's appointments and related contact information. For example, a trip starting at 9:15 a.m. and a dentist appointment at 10 a.m. could be the basis for predicting a trip to the dentist. When there have been prior trips to the same appointment, those trips become top predictions. Lacking prior trips, an extending application might extract the dentist's address from the contact data in the organizer and consult a mapping service for the location and recommended routes. An exemplary behavior prediction rule for matching trips includes:

```
WHEN starting a trip now
    AND there is a regular-trip that starts close to the same place
    AND at about the same time of day
    AND the day of the week today fits the pattern of weekdays in
    the regular-trip
THEN PREDICT a destination as the destination of this regular-trip via
the route in the regular trip
    AND an arrival time as now plus the average trip time
    AND give it a ranking score as the number of times this regular-trip
    occurred
        Adjusting for day of week uncertainly (e.g. seen Monday and
        Tuesday but today is Thursday)
```

In an alternate exemplary embodiment of the present invention, the knowledge that has been collected is utilized to provide better information to the vehicle operator 212. For example, in an urban environment, traffic problems may be frequent and unpredictable. Many urban freeways and some major streets now feature real-time data collection of traffic conditions, but delivery of the information to vehicle operators 212 is not very effective. Existing channels for disseminating the information includes radio announcements, television and web pages. Radio often lags fifteen to twenty minutes behind traffic problems and the driver has to listen to reports for the entire region. Television also lags behind, and, like the web, presents a visual distraction that is likely to impair driving. Assuming the traffic data can be distributed digitally to vehicles, knowledge of the vehicle operator's likely route and destination makes it possible to isolate advisories relevant to the current location and predicted route. While GPS information alone can support partial filtering of traffic data, it will require either presenting some unneeded reports or result in some surprises when a driver turns into another road. With knowledge of the possible routes, traffic can be evaluated based on each route, and finally interrupt the vehicle operator with advice at a point where an alternate route is more effective.

The data may be made available by several possible channels. It could be broadcast in a region on a FM radio station's subsidiary carrier authorization (SCA) channel or a paging channel. It could also be implemented as a query/response transaction over some wireless digital network. Here are examples of some possible rules for traffic advisories:

```
/* Warn about traffic:
If passing the current position and heading along a predicted route to
the freeway traffic advisory API returns "traffic speed ahead under 16
MPH"
   THEN
      mark predicted route as JAMMED
/* Divert driver:
IF a predicted route is JAMMED
   AND another predicted route to the same destination is not
JAMMED
   AND this is the most likely destination
   AND current position is approaching the point where the two routes
   diverge
   THEN advise driver to take the other route
```

An exemplary embodiment of the present invention may be utilized to anticipate a vehicle operator's behavior. The predicted behavior may then be utilized to make situation specific advice that is more likely to be useful (e.g., warning of traffic problems along likely routes). In addition, the ability to create and manage trip information based solely on the navigation data may eliminate the need for a large local road database or for continuous access to a database service. Understanding a vehicle operator's driving behaviors may facilitate and improve vehicle operator interaction with telematics systems and may also provide the capability of access to information when needed for a myriad of e-commerce and business-to-consumer services. Applications for exemplary embodiments of the present invention include telematics services for a GM Smart Car program to minimize vehicle operators' interaction with complex web-based services. The vehicle operator may automatically interact with the existing e-commerce services (e.g., highway traffic monitor, entertainment, maintenance, hotels) based on the vehicle operator's past driving behavior.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for predicting vehicle operator destinations, the method comprising:
   receiving a plurality of vehicle position data for previous trips of a vehicle;
   segmenting the vehicle position data into one or more individual trips based on one or more of an ignition cycle and an extended period of time at a single geographic location, each individual trip including a starting location, an ending location, a start time, a route and a duration;
   replacing two or more of the individual trips with a regular trip if both of the individual trips have proximate starting locations, ending locations, start times, routes and durations, wherein a starting location of the regular trip is the average of the starting locations of both trips, an ending location of the regular trip is the average of the ending locations of both trips, a start time of the regular trip is the average of the start times of both trips, a route of the regular trip is the route of one of the individual trips, and a duration of the regular trip is the average of the durations of both trips; and
   storing the regular trips in a database.

2. The method of claim 1 further comprising:
   receiving one or more vehicle position data for a current trip of the vehicle, the vehicle position data including a starting location and a start time of the current trip;
   selecting a regular trip from the database, the regular trip having a starting location proximate to the starting location of the current trip and a start time proximate to the start time of the current trip;
   predicting a destination of the current trip equal to the ending location of the regular trip; and
   suggesting the route of the regular trip to the predicted destination.

3. The method of claim 2 wherein said predicting further includes performing event categorization and pattern recognition.

4. The method of claim 3 wherein said event categorization includes identifying transitions between said vehicle being stopped and said vehicle being underway.

5. The method of claim 1 wherein said geographic location includes navigation coordinates.

6. The method of claim 5 wherein said navigation coordinates are GPS coordinates.

7. The method of claim 2 wherein said predicting includes performing behavior prediction and modeling driver activity.

8. The method of claim 2 further comprising communicating to an operator of said vehicle responsive to said suggesting.

9. The method of claim 8 wherein said communicating is further responsive to vehicle data.

10. The method of claim 8 wherein said communicating is further responsive to environment data.

11. The method of claim 2 further comprising communicating said route to a telematic service.

12. The method of claim 11 wherein said telematic service is one or more of navigation, traffic, weather, travel, and car maintenance.

13. The method of claim 2 wherein each of said vehicle position data for the current trip further includes a vehicle heading and a vehicle speed.

14. The method of claim 2 wherein said receiving one or more vehicle position data occurs in response to said vehicle moving a pre-selected distance.

15. The method of claim 2 further comprising receiving information from one or more external sources, wherein said predicting is based on the information from one or more external sources and the results of the comparing.

16. The method of claim 2 wherein said receiving one or more vehicle position data occurs once during each pre-selected time interval.

17. The method of claim 1 wherein said vehicle is an automobile.

18. A method for predicting vehicle operator destinations, the method comprising:
   receiving one more vehicle position data for a vehicle, each vehicle position data including a geographic location and a timestamp;
   if the vehicle position data is for one or more previous trips of the vehicle then:
      segmenting the vehicle position data into one or more individual trips based on one or more of an ignition cycle and an extended period of time at a single geographic location, each individual trip including a starting location, an ending location, a start time, a route and a duration; and
      replacing two or more of the individual trips with a regular trip if both of the individual trips have proximate starting locations, ending locations, start times, routes and durations, wherein a starting location of the regular trip is the average of the starting locations of both trips, an ending location of the regular trip is the average of the ending locations of both trips, a start time of the regular trip is the average of the start times of both trips, a route of the regular trip is the route of one of the individual trips, and a duration of the regular trip is the average of the durations of both trips; and
   if the vehicle position data is for a current trip of the vehicle then:
      setting the geographic location of one of the vehicle position data equal to a starting location of the current trip and the timestamp of one of the vehicle position data equal to a starting location of the current trip;
      predicting a destination of the current trip equal to the ending location of the regular trip when the starting location of the current trip is proximate to the starting location of the regular trip and the start time of the current trip is proximate to the start time of the regular trip; and
      suggesting the route of the regular trip to the predicted destination.

19. A system for predicting vehicle operator destinations, the system comprising:
   a navigation device;
   a storage device;
   a microprocessor in communication with said navigation device and said storage device, said microprocessor including instructions for facilitating:
      receiving a plurality of vehicle position data for previous trips of a vehicle via the navigation device, each vehicle position data including a geographic location and a timestamp;
      segmenting the vehicle position data into one or more individual trips based on one or more of an ignition cycle and an extended period of time at a single geographic location, each individual trip including a starting location, an ending location, a start time, a route and a duration;
      replacing two or more of the individual trips with a regular trip if both of the individual trips have proximate starting locations, ending locations, start times, routes and durations, wherein a starting location of the regular trip is the average of the starting locations of both trips, an ending location of the regular trip is the average of the ending locations of both trips, a start time of the regular trip is the average of the start times of both trips, a route of the regular trip is the route of one of the individual trips, and a duration of the regular trip is the average of the durations of both trips; and
      storing the regular trips in a database on the storage device.

20. The system of claim 19 wherein said navigation device is a GPS receiver.

21. The system of claim 19 wherein said storage device is physically located within said microprocessor.

22. A computer program product for predicting vehicle operator destinations, the product comprising:
   a storage medium readable by a processing circuit and storing instructions for execution by the processing circuit for performing a method comprising:
      receiving a plurality of vehicle position data for previous trips of a vehicle, each vehicle position data including a geographic location and a timestamp;
      segmenting the vehicle position data into one or more individual trips based on one or more of an ignition cycle and an extended period of time at a single geographic location, each individual trip including a starting location, an ending location, a start time, a route and a duration;
      replacing two or more of the individual trips with a regular trip if both of the individual trips have proximate starting locations, ending locations, start times, routes and durations, wherein a starting location of the regular trip is the average of the starting locations of both trips, an ending location of the regular trip is the average of the ending locations of both tdps, a start time of the regular trip is the average of the start times of both trips, a route of the regular trip is the route of one of the individual trips and a duration of the regular trip is the average of the durations of both trips and storing the regular trips in a database.

* * * * *